United States Patent [19]
Raidel, Sr.

[11] Patent Number: 4,465,298
[45] Date of Patent: Aug. 14, 1984

[54] U-JOINT MOUNT AND LATERAL GUIDE FOR AIR SPRING SUSPENSION

[76] Inventor: John E. Raidel, Sr., Rte. 9, Box 400-M, Springfield, Mo. 65804

[21] Appl. No.: 431,755

[22] Filed: Sep. 30, 1982

Related U.S. Application Data

[63] Continuation-in-part of Ser. No. 341,474, Jan. 21, 1982, abandoned.

[51] Int. Cl.³ .............................................. B60G 11/26
[52] U.S. Cl. .................................... 280/711; 280/713
[58] Field of Search ............... 280/702, 705, 709, 711, 280/712, 713, 691, 693

[56] References Cited

U.S. PATENT DOCUMENTS

| | | | |
|---|---|---|---|
| 3,547,215 | 12/1970 | Bird | 280/713 |
| 4,132,433 | 1/1979 | Willetts | 280/712 |
| 4,309,045 | 1/1982 | Raidel | 280/711 |
| 4,397,478 | 8/1983 | Jensen et al. | 280/711 |
| 4,406,479 | 9/1983 | Chalmers | 280/711 |

Primary Examiner—Richard A. Bertsch
Attorney, Agent, or Firm—Rogers, Eilers & Howell

[57] ABSTRACT

A suspension system for a drive axle includes an angular torque beam fixedly secured to the axle, one or two air springs extending between the torque beam and the chassis, and a universal joint comprised of two transversely mounted rubber bushings mounting the forward end of the torque beam to the chassis. The drive axle suspension may also have a beam guide mounted to the torque beam and extending upwardly adjacent the chassis frame, or a cross radius rod to limit lateral movement. Another embodiment of the suspension is for a steer axle which has a straight torque beam and either an outboard beam guide or an aft vertical rail guide to limit the lateral displacement of the suspension with respect to the chassis.

27 Claims, 21 Drawing Figures

U-JOINT MOUNT AND LATERAL GUIDE FOR AIR SPRING SUSPENSION

BACKGROUND AND SUMMARY OF THE INVENTION

This application is a continuation-in-part of Ser. No. 341,474 filed Jan. 21, 1982, now abandoned.

Air suspensions for drive axles of truck type vehicles are very desirable as they provide increased comfort for the operator and, with proper stabilization of the axle, better control and safety. Applicant is the inventor of several prior air spring suspensions which can be used with drive axles including U.S. Pat. No. 4,114,923; U.S. Pat. No. 4,132,432; and U.S. Pat. No. 4,181,323, the disclosures of which are incorporated herein by reference. All of these patents disclose air spring suspensions wherein a torque beam is rigidly mounted to an axle and an air spring suspends the torque beam from a chassis. Also, in each of these patents the movement of the torque beam is controlled through a parallelogram arrangement of torque rods which maintains the pitch of the axle to maintain the drive line in alignment as the axle oscillates with respect to the chassis. Also, several of these suspensions have a sway bar transversely mounted between the chassis and suspension to limit the lateral movement of the suspension as it oscillates. Of course, there are other features and advantages of each of these patented suspensions which will not be discussed as they are fully disclosed and claimed in their respective patents.

In the present invention, applicant has succeeded in developing a unique structure for controlling axle movement and stabilizing the suspension as the axle moves up and down in response to uneven road surfaces, or as one side of the truck goes over a curb, chuck hole, or other significant change in elevation with respect to the other side of the vehicle. In particular, applicant's new mounting structure for the torque beam and suspension will greatly minimize or eliminate the torsional forces in the beam which would otherwise be experienced as one side of the axle moves up or down with respect to the other. This is achieved by use of a pair of transversely mounted rubber bushings, one of the bushings being mounted coaxially to the torque beam and the other bushing being transversely mounted to the first bushing and pivotally mounted to a chassis member. Thus, twisting movement of the suspension in a lateral plane with respect to the chassis may be accommodated through pivotal movement of one bushing while pivotal movement of the rear of the suspension in a longitudinal plane may be accommodated by pivoting in the other bushing. Each suspension is free to move in this manner as one side of the axle moves up or down with respect to its other side. Furthermore, in the first two embodiments of the drive axle, one suspension is mounted to each axle at each side of the truck and they are rigidly connected with a torsion-roll bar extending therebetween. As a result, both suspensions want to move as a single assembly and the transversely mounted bushings permit such movement to a limited extent to prevent torsioning of either torque beam. In a variation of these embodiments, a beam guide comprising a bracket extending upwardly from the torque beam and a wear pad mounted to the chassis frame limits the lateral displacement of the suspension and axle with respect to the chassis. In the steer axle embodiment, a pair of roller type beam guides extend downwardly from each side of the chassis and ride against a flattened surface on the outside of each torque beam to prevent lateral displacement of the chassis with respect to the suspension, and thereby perform the same function as a sway bar. In a variation of this embodiment, an aft beam member with a self-lubricating fiber sleeve extends between a pair of spaced vertical rail guides to limit lateral chassis displacement. A beam guide is particularly advantageous in a steer axle suspension as the steering components take up much of the available space for a sway bar, and it is easier to install and maintain.

The first two embodiments of the drive axle suspensions generally include an angular torque beam which extends rearwardly along the top of the axle, downwardly, and then rearwardly to provide a platform for mounting of the air spring. The air spring is mounted at the rear of the angular torque beam and extends between it and the chassis. The axle is clamped to a medial portion of the angular torque beam with a standard axle bracket and U-bolt assembly. The forward end of the torque beam has a first rubber bushing which is coaxially mounted to the torque beam. A second transversely oriented rubber bushing is pivotally connected to the first bushing and, depending upon the embodiment, is either over or under the first bushing. The second bushing is then pivotally mounted to a chassis member. A cross radius rod is pivotally connected to and extends between the center of the axle and a chassis member to further stabilize the axle and limit its lateral movement. Alternately, a beam guide including a bracket mounted to the torque beam, sliding against a wear pad mounted to the chassis limits lateral axle displacement. A torsion roll-bar is mounted at the rear of the angular torque beam and extends from one side of the vehicle to the other to connect suspensions on opposite sides thereof. One or more shock absorbers extend between the angular torque beam and the chassis, as is known in the art. In a third embodiment, a straight torque beam is clamped to the axle, and a pair of air springs suspend the beam and axle from the chassis, one on either side of the axle. The U-joint assembly comprising the transversely oriented bushings mount the fore end of the torque beam to a chassis member as in the other embodiments.

The steer axle suspension embodiment includes a generally straight torque beam extending longitudinally beneath the chassis member and bolted to the top of the steer axle. An air spring platform is provided in the rearward half of the torque beam immediately above the axle with an air spring extending between the platform and chassis. An overload bumper is mounted adjacent to and rearwardly of the air spring, and a downwardly extending tail piece on the torque beam provides a mounting position for a shock absorber. A roller guide is mounted to the chassis and extends downwardly at a point just forward of the spring and outboard of the torque beam. An upstanding bracket member is welded to the top of the torque beam and, along with the side of the torque beam forms a generally flattened surface against which the roller may roll as the suspension oscillates. Of course, as a suspension is mounted to each side of the vehicle, each suspension being rigidly bolted to the axle, the roller guides "capture" the suspension-axle assembly between them to restrict the lateral movement thereof much as a sway bar. The forward end of the torque beam is secured to the chassis with a univeral joint combination as in applicant's drive axle suspensions. In an alternate embodiment, the beam guide comprises a rod-like member extending rearwardly from the rear of the torque beam and between two spaced apart vertically extending brackets secured to the chassis. A self-lubricating fiber sleeve surrounds the rod which facilitates the unrestricted movement thereof between the close fitting vertical brackets. Lateral movement of the suspension is resisted by the bracket's contact with the rod.

Applicant's suspensions are shown and described more completely in the following drawings and description of the preferred embodiments.

DETAILED DESCRIPTION OF THE PREFERRED EMBODIMENT

Figure 1:
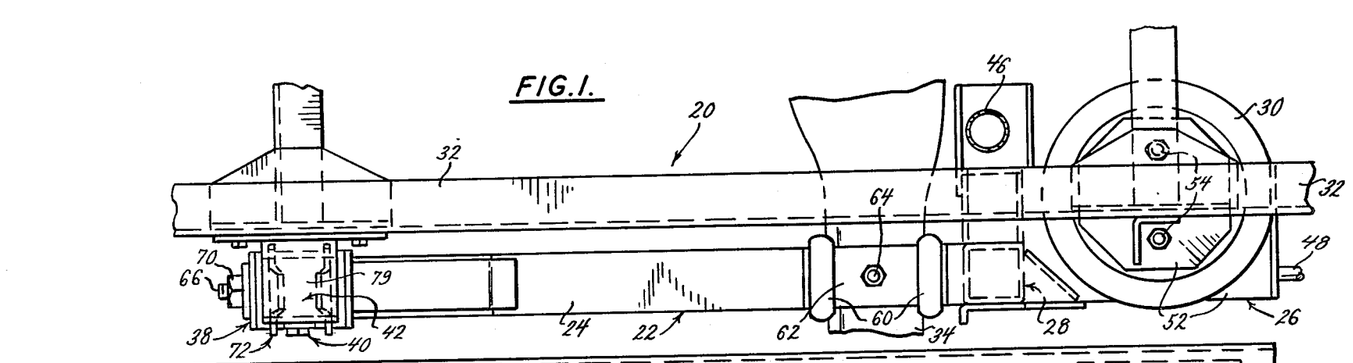
FIG. 1 is a top view of the first embodiment of applicant's drive axle suspension.
Figure 2:
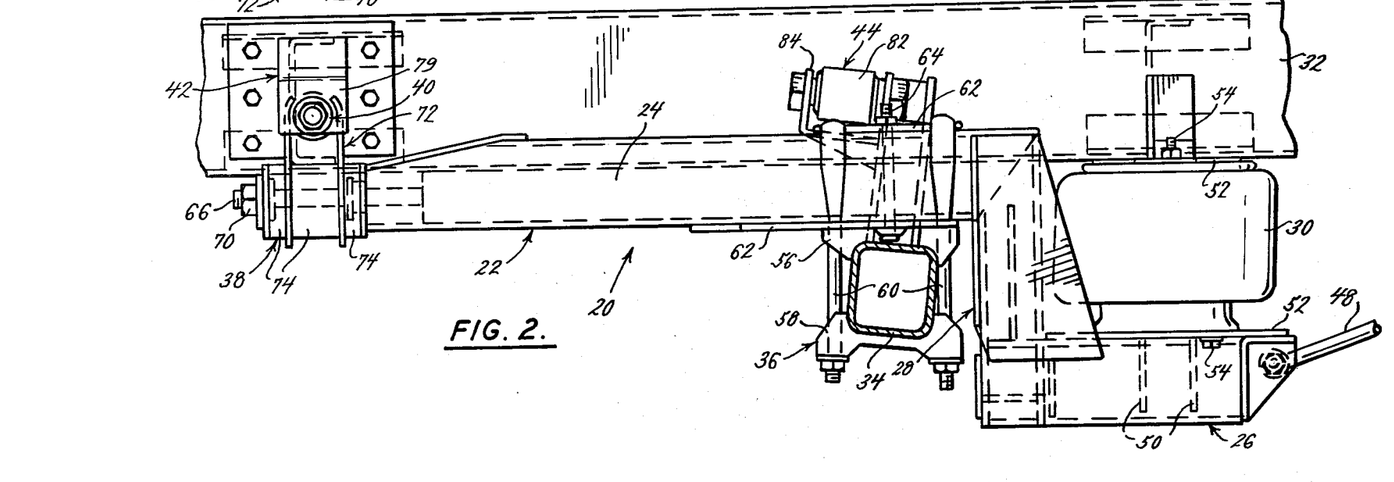
FIG. 2 is a side view of the first embodiment.
Figure 3:
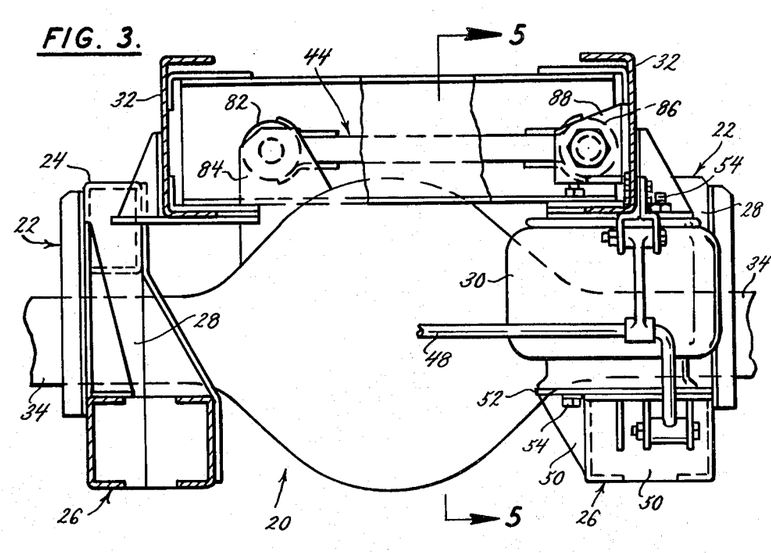
FIG. 3 is a rear view of the first embodiment showing the cross radius rod.
Figure 4:
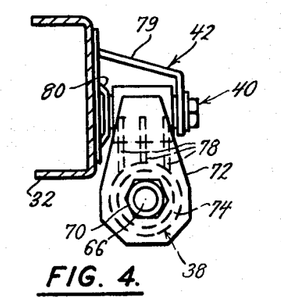
FIG. 4 is a front view of the first embodiment showing the second bushing mounted transversely above the first bushing.
Figure 5:
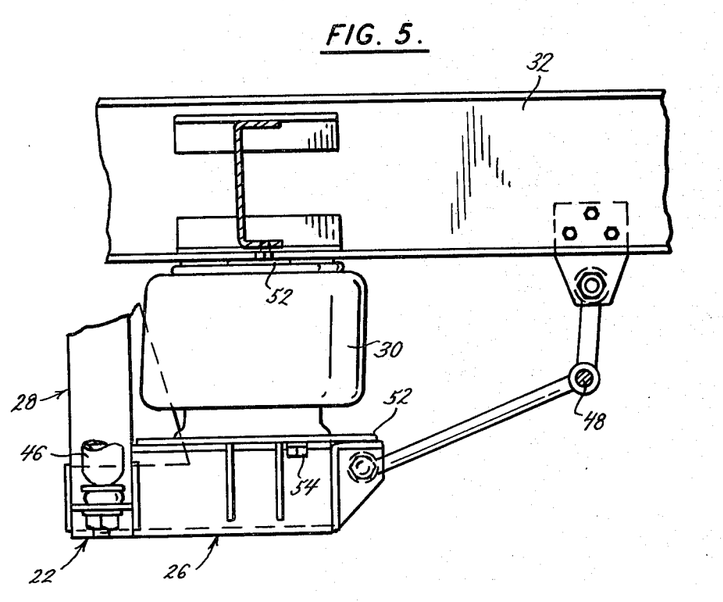
FIG. 5 is a partial side view taken along the plane of line 5—5 in FIG. 3 detailing the torsion roll bar.

Applicant's first embodiment 20 of the drive axle suspension is shown in FIGS. 1 through 5 and, with particular reference to FIGS. 1 and 2, generally includes an angular torque beam 22 having a first horizontal member 24, a second horizontal member 26, and a generally vertical member 28 extending therebetween. An air spring 30 is bolted to and extends between the second horizontal member 26 and the chassis 32. The axle 34 is fixedly secured to the first horizontal member 24 by an axle seat assembly 36. The forward end of torque beam 22 is pivotally mounted to a first rubber bushing 38 which is coaxially aligned therewith. A second, transversely mounted, rubber bushing 40 is pivotally mounted to the first rubber bushing 38 and above same. This is best shown in FIG. 4. The second rubber bushing 40 is itself pivotally mounted to a bracket assembly 42 secured to the chassis 32. As shown in FIG. 3, a cross radius rod 44 is pivotally connected to and extends between the axle 34 and chassis 32. A shock absorber 46 is shown figuratively in FIG. 1, and may be conveniently mounted at any point along the chassis 32 and extend to the torque beam 22. A torsion roll-bar 48, as is best shown in FIGS. 3 and 5, extends between the chassis 32 and suspensions 20 mounted on opposite sides of the vehicle. Having generally described the major components of the drive axle suspensions, applicant will now proceed with a more detailed description thereof.

The torque beam 22 is generally a hollow rectangular beam having varying dimensions in its various members. Accordingly, strengthening webs 50 are mounted at various points along the torque beam 22 to further rigidize and brace it. Spring support plates 52 and bolts 54 are used to secure air spring 30 to both the chassis 32 and second horizontal member 26, as is known in the art. The axle bracket assembly 36 includes an upper axle bracket 56, a lower axle bracket 58, a pair of U-bolts 60, and upper and lower strengthening brackets 62 held in place by nut and bolt assembly 64. The forward end of applicant's torque beam 22 is formed into a threaded mounting stud 66 which extends through first rubber bushing 38 and is secured thereto with nut 70. A swivel bracket 72 is mounted to first rubber bushing 38 and aligned with spacers 74 thereon. Swivel bracket 72 surrounds the second rubber bushing 40 and has strengthening web 78. Bracket assembly 42 mounts second bushing 40 with an eccentric bolt assembly to chassis 32 and is comprised of an outer hanger bracket 79 and an inner hanger bracket 80, both of which are secured by welding or the like to the chassis 32, as best shown in FIG. 4. Cross radius rod 44 is best shown in FIG. 3 and has a pivotal connection 82 securing it to an axle mounting bracket 84 at one end; with a second pivotal connection 86 securing it to a chassis mounting bracket 88 at its other end.

Figure 6:
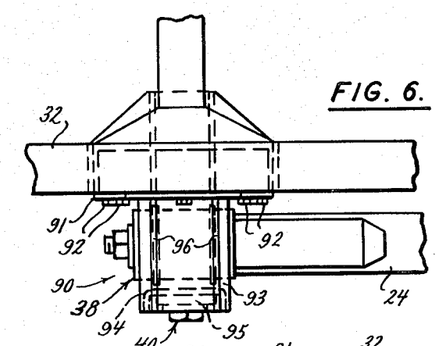
FIG. 6 is a top view of the forward end of applicant's second embodiment.
Figures 7, 8:
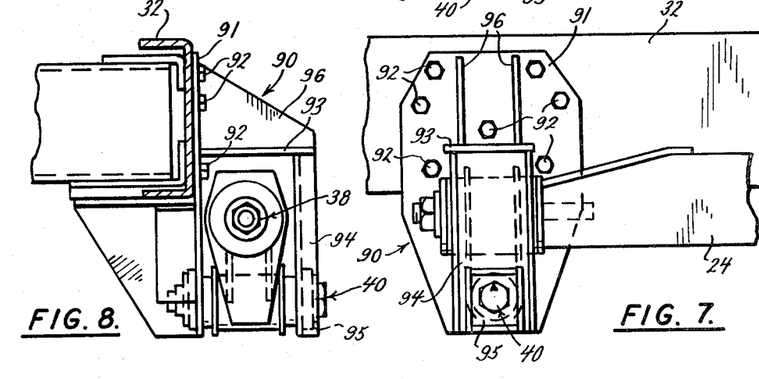
FIG. 7 is a side view of the forward end of the torque beam showing the second bushing mounted beneath the first bushing in the second embodiment.
FIG. 8 is a front view of the second embodiment of applicant's drive axle suspension showing in greater detail the hanger assembly and mounting of the second bushing below the first.

Applicant's second embodiment of the drive axle suspension is depicted in FIGS. 6 through 8 and is very similar to the embodiment shown in FIGS. 1 through 5 except that a different hanger assembly 90 is utilized which permits mounting of the second bushing assembly 40 below the first bushing assembly 38. This is best seen by comparing FIG. 8 (second embodiment) with FIG. 4 (first embodiment). Hanger assembly 90 has a back plate 91 which is secured by bolts 92 to chassis member 32, a horizontal bracket 93 extending outwardly from back plate 91, and a side plate 94 which depends downwardly therefrom. An adjustable mounting plate 95 mounts one end of second bushing 40 to side plate 94 and the other end thereof mounts to back plate 91. Gussets 96 extend between these various brackets to strengthen same. A swivel bracket 72 pivotally connects first bushing 38 to second bushing 40 with an eccentric bolt assembly, as in the first embodiment 20.

Figure 9:
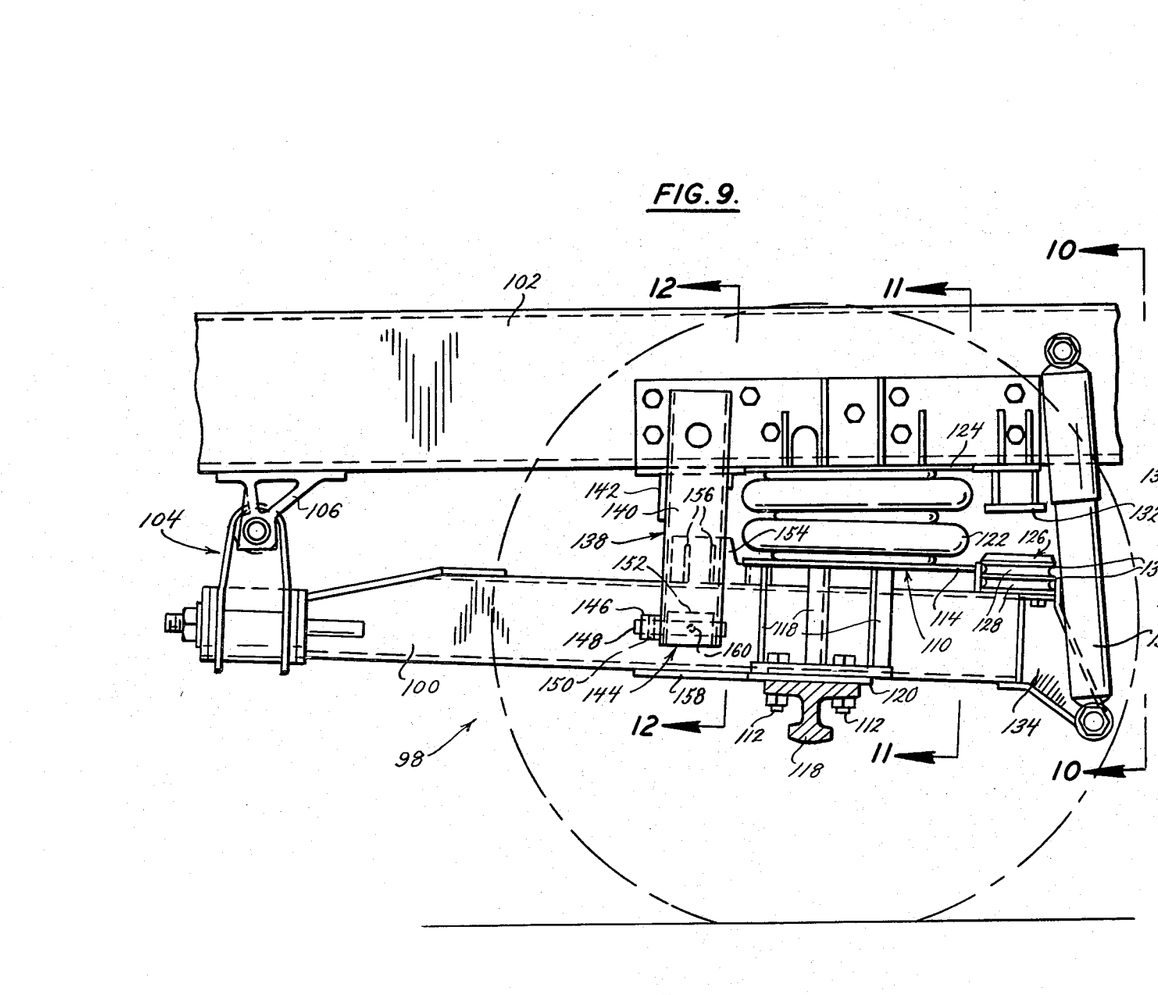
FIG. 9 is a side elevational view of applicant's steer axle suspension.
Figure 10:
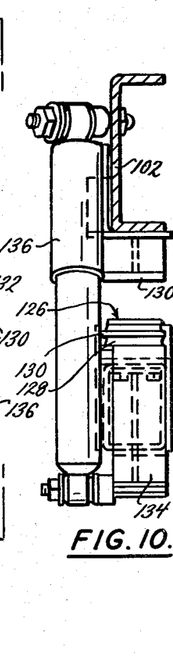
FIG. 10 is a rear view of the steer axle suspension taken along the plane of line 10—10 in FIG. 9.
Figure 11:
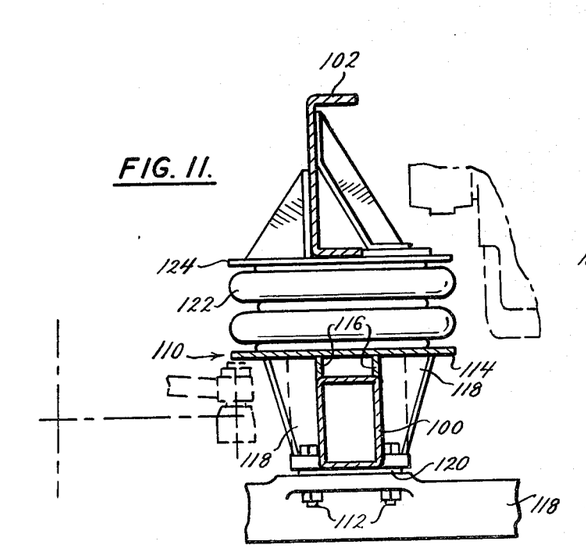
FIG. 11 is a cross-sectional view taken along the plane of line 11—11 in FIG. 9 and detailing the air spring platform.

Applicant's steer axle embodiment 98 is shown in FIGS. 9-13 and, with reference to FIG. 9, includes a generally straight torque beam 100 having a substantially rectangular cross section with its forward end mounted to the chassis 102 by a universal joint 104 which is substantially similar to the transversely mounted rubber bushings 38, 40 shown in FIG. 2. A slightly different bushing bracket 106 mounts the upper bushing of universal joint 104 to chassis 102. However, there is no change in function. The steer axle 118 is bolted to the air spring platform 110 by a plurality of bolt assemblies 112. As best shown in FIG. 11, the air spring platform 110 includes an upper mounting plate 114 supported by two bracket members 116 welded to the top of the torque beam 100 and a plurality of cross webs 118 extending between the upper mounting plate 114 and a lower axle plate 120. An air spring 122 is mounted and extends between the upper mounting plate 114 and a top plate 124, top plate 124 being welded to chassis 22. An overload bumper 126 is mounted rearwardly of the air spring platform 110 and is comprised of a sandwich spring having elastomeric pads 128 between steel plates 130. A matching upper bumper 132 is welded to the chassis 22 and extends downwardly therefrom to contact overload bumper 126 upon excessive loading or compression of air spring 122. A tail piece 134 angles downwardly from the rear of torque beam 100 and provides a convenient mounting position for shock absorber 136.

Figure 12:
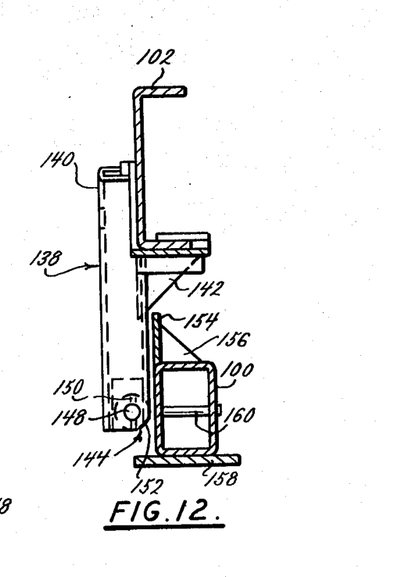
FIG. 12 is an oblique cross-sectional view taken along the plane of line 12—12 in FIG. 9 and detailing the roller guide.
Figure 13:
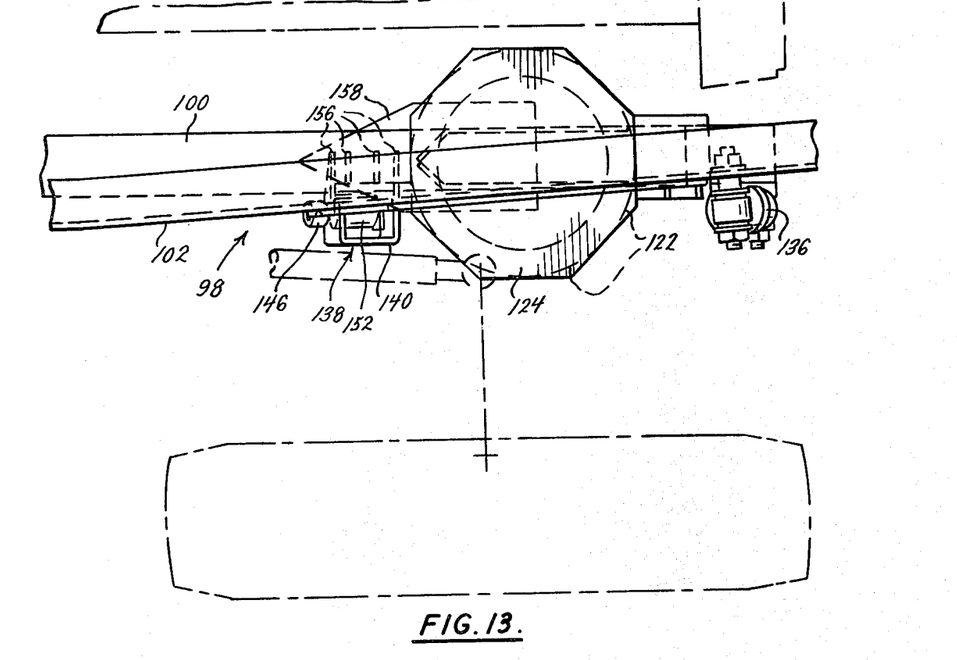
FIG. 13 is a top view of applicant's steer axle suspension.

As best shown in FIGS. 9 and 12, a roller guide 138 is mounted forwardly of air spring 122 and outboard of torque beam 100 and generally includes an elongated bracket member 140 welded to and extending downwardly from the chassis 102, with several strengthening webs 142 welded therebetween. Elongated bracket member 140 is generally U-shaped in cross section such that a roller assembly 144 may be mounted near the lower end thereof. Roller assembly 144 includes a boss 146 welded to the forward side of bracket member 140, with an axle pin 148 extending through boss 146 and bracket member 140 and pinned in place by linch pin 150. A roller 152 is rotatably mounted to axle pin 148 and between the ears of U-shaped elongated bracket member 140.

As best shown in FIG. 12, the roller 152 very nearly rests on the side of torque beam 100, with an upstanding bracket 154 welded to the top of torque beam 100 with strengthening webs 156 extending therebetween. A splash plate 158 is welded to the bottom of torque beam 100 and a brace 160 extends through the interior of torque beam 100 directly opposite roller assembly 144 to prevent deformation of the torque beam 100 as the suspension 98 oscillates.

Figure 14:
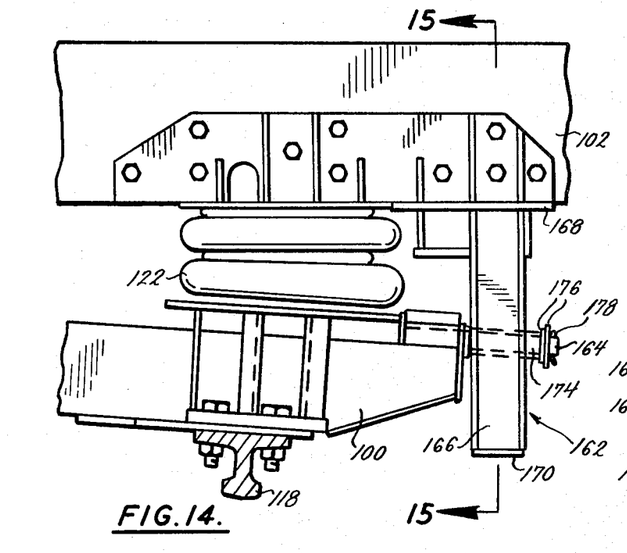
FIG. 14 is a partial side view of the steer axle suspension showing the alternate beam guide.
Figure 15:
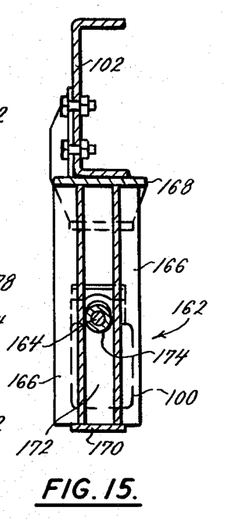
FIG. 15 is a cross-sectional view taken along the plane of line 15—15 in FIG. 14 which further details the alternate beam guide.

As an alternative to the roller guide 138 depicted in FIG. 9 with a steer axle suspension, an alternate beam guide 162 may be provided at the rear of torque beam 100 as shown in FIGS. 14 and 15. As shown therein, a rod-like beam extension 164 extends rearwardly from torque beam 100 between a pair of spaced vertical bracket members 166 which are welded to a top plate 168 which is in turn welded to chassis frame 102. A bottom plate 170 encloses the space 172 defined between bracket members 166 and within which rod 164 travels as torque beam 100 and axle 118 oscillate with respect to the chassis 102 during vehicle operation. A self lubricating fiber sleeve 174 slides over rod 164 and is held in place with washers 176 and cotter key 178. Thus, lateral displacement of torque beam 100 and axle 118 is restricted through contact between fiber sleeve 174 and surrounding rod 164 and bracket members 166.

Figure 16:
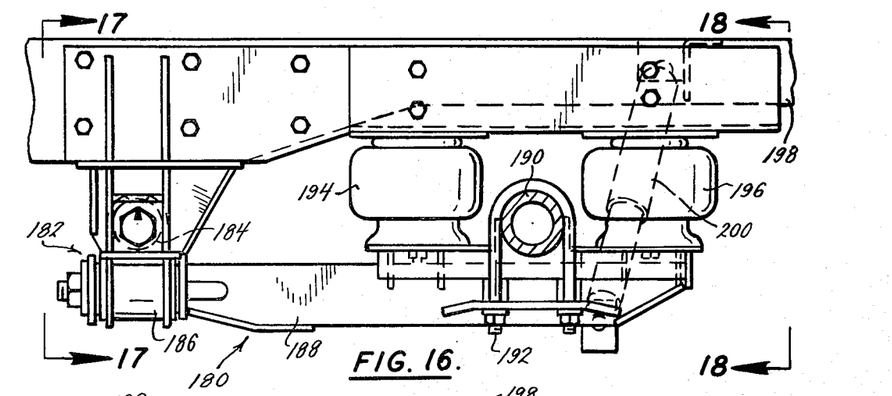
FIG. 16 is a side view of the third embodiment of the drive axle suspension having two air springs.
Figure 17:
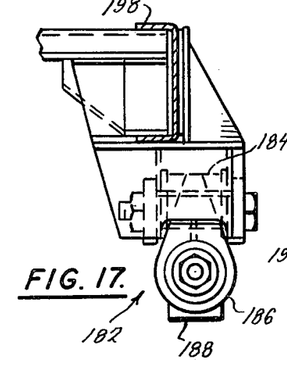
FIG. 17 is a front view of the suspension of FIG. 16, taken along the plane of line 17—17 in FIG. 16.
Figure 18:
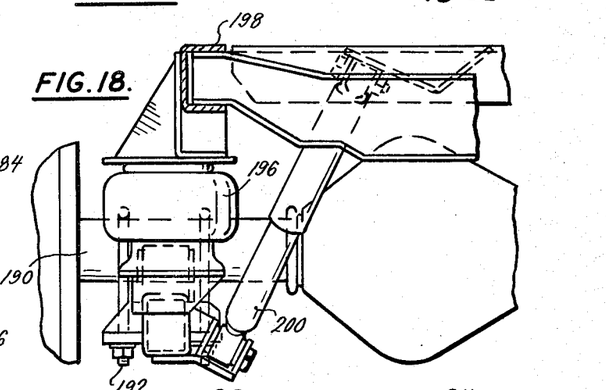
FIG. 18 is a rear view of the suspension of FIG. 16, taken along the plane of line 18—18 in FIG. 16.

A third embodiment 180 of a drive axle suspension is shown in FIGS. 16, 17 and 18 which incorporates many of the same components of other embodiments disclosed herein. For example, a U-joint assembly 182 comprised of an upper rubber bushing assembly 184 and a lower rubber bushing assembly 186 mount the fore end of a straight torque beam 188. Torque beam 188 is bolted to axle 190 by U-bolt assembly 192 with a fore air spring 194 and aft air spring 196 suspending torque beam 188 and axle 190 from chassis 198. One or more shock absorbers 200 are mounted to torque beam 188 and chassis member 198, as is known in the art. Thus, a dual air spring suspension is provided which utilizes the U-joint mounting of the fore end of its torque beam to permit limited flexing in both the longitudinal and lateral planes during vehicle operation.

Figure 19A:
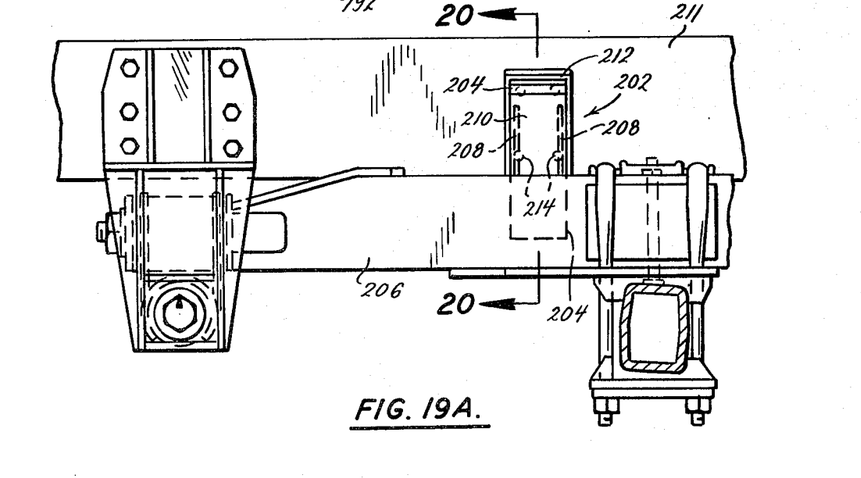
FIGS. 19A and 19B are side views of the drive axle suspension with angular torque beam with beam guide.
Figure 19B:
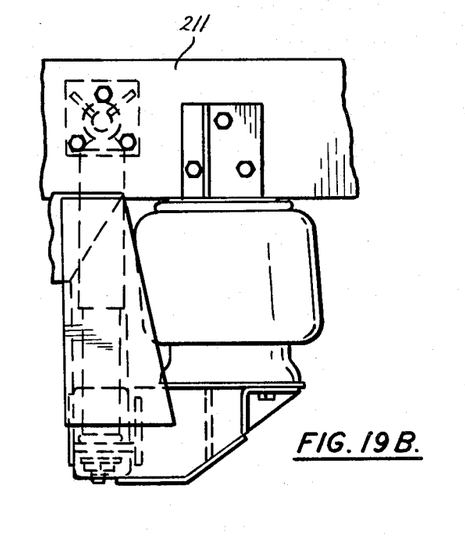
Figure 20:
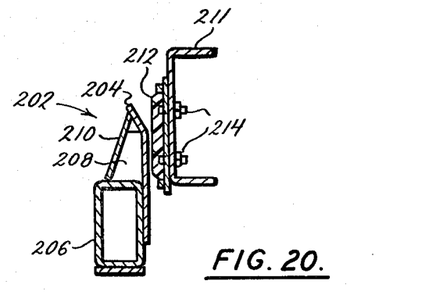
FIG. 20 is a cross-sectional view of the beam guide of FIG. 19A-B taken along the plane of line 20—20 in FIG. 19A.

Still another alternative to the beam guides previously disclosed in this application is the beam guide 202 shown in FIGS. 19A, 19B and 20 as used with a drive axle suspension similar to that shown in FIGS. 1-5. Beam guide assembly 202 includes an angular bracket member 204 welded to the inside of torque beam 206 with a pair of bracket struts 208 and a back plate 210 supporting same. The upper portion of bracket 204 is bent away from frame member 210 to prevent the beam guide 202 from catching underneath the frame member 211 during operation. A wear pad 212 is bolted to frame member 211 with bolts 214 and provides a surface against which the face of bracket member 204 may slide. Wear pad 212 may be a self lubricating fiber pad or some other similar type of material which facilitates the read sliding of the beam guide 202 during vehicle operation.

OPERATION

As can be appreciated from the foregoing, applicant's drive axle suspension comprises a torque beam which is fixedly mounted to the axle and which has an air spring suspending it from the chassis at its rearward end. The forward end of the torque beam is mounted through a universal joint comprised of transversely aligned first and second rubber bushings. The first rubber bushing is coaxially mounted to the forward end of the torque beam and accommodates lateral "rocking" or pivoting thereof such as might be experienced should one end of the axle move upwardly with respect to the other end of the axle. As can be appreciated, as the vehicle is driven over a curb or chuck hole, this condition can exist which would otherwise tend to torsion the torque beam. The first rubber bushing in each suspension accommodates this twisting movement by permitting limited pivoting of the beam in a lateral plane with respect to the chassis.

The second rubber bushing which may be mounted either above or below the first rubber bushing, is oriented transversely to the first bushing and parallel to the axle. As the spring is mounted at the opposite end of the torque beam, up and down movement of the axle and spring result in a pivoting movement about this second bushing in a longitudinal plane. In applicant's second embodiment, the second rubber bushing lies beneath the first rubber bushing and closer to the horizontal plane passing through the center line of the axle. As can be appreciated, this results in a more desirable pivoting movement for the suspension as a radius drawn between the centerlines of the axle and second bushing is virtually horizontal such that the axle stays closer to its desired "pitch" as the suspension oscillates. Of course, in a drive line it is desirable to maintain the axle in a constant pitch as it oscillates with respect to the chassis to maintain the drive line in alignment. With applicant's second embodiment, this oscillation results in more effective alignment control, although both embodiments are more than adequate for reliable operation. The cross radius rod and torsion bar operate as in any of applicant's other suspensions, and as known in the art.

In the steer axle embodiment, the forward end of the torque beam is mounted with a universal joint much as in the two embodiments of the drive axle suspension, and operates substantially as described above. However, instead of a cross radius rod and torsion-roll bar, a roller guide means is provided on the outboard side of each suspension to limit the lateral displacement of the suspension and axle with respect to the chassis. The roller guide means includes a roller assembly mounted to an end of a bracket member welded to the chassis and extending downwardly, with the roller aligned with the side of the torque beam and an upstanding bracket mounted to the top of the torque beam to provide an adequate amount of travel to accommodate oscillation of the suspension during operation. A brace extends between the side walls of the torque beam to strengthen same and accommodate the increased stress at that point caused by the roller guide means. A splash plate mounted to the bottom of the torque beam helps to protect the roller guide and prevent an undue amount of debris from being thrown onto the roller and its surface. The roller guide means helps provide lateral stability without the use of a cross radius rod, panhard bar, or other similar structure which would be very difficult to fit within the severe space limitations imposed on a steering axle suspension.

Various changes and modifications to applicant's invention would be apparent to one of ordinary skill in the art. These changes and modifications are taught by applicant and are included in his invention which is limited only by the scope of the claims appended thereto.

I claim:

1. A suspension system for supporting the chassis of a vehicle from at least one axle comprising a torque beam having a medial portion adapted to mount to the axle, a downwardly depending member, and a rearwardly extending spring platform, a spring means mounted to said platform at the rear of the beam and rearwardly of the axle, and adapted to mount to the chassis, and means to mount the other end of said torque beam to the chassis, said beam mounting means including a universal joint having means to permit limited pivoting of said beam thereabout in a longitudinal plane, and rotation of said beam about its longitudinal axis to minimize torsional forces therein as the axle moves with respect to the chassis.

2. The suspension of claim 1 wherein the universal joint comprises a first rubber bushing coaxially mounted to the beam and a second rubber bushing transversely mounted to said first bushing and adapted to mount to the chassis.

3. The suspension of claim 1 further comprising a cross radius rod for pivotally connecting to and extending laterally between the axle and the chassis.

4. The suspension of claim 1 further comprising guide means for extending downwardly from the chassis and adjacent the suspension to limit the lateral displacement of the suspension with respect to the chassis.

5. The suspension of claim 4 wherein the axle is a steer axle.

6. The suspension of claim 4 wherein the guide means includes a mounting bracket, and a roller means mounted near the lower end of said bracket, the torque beam having a generally flattened surface against which said roller means may roll to limit lateral displacement of said suspension.

7. The suspension of claim 6 wherein the mounting bracket includes a boss, the roller means having an axle pin extending through said boss and mounting bracket, means securing the axle pin to the boss, and a roller rotatably mounted to the axle pin.

8. The suspension of claim 6 wherein the side of the torque beam forms a portion of the generally flattened surface and wherein an upstanding bracket is secured to the torque beam to form another portion of said surface.

9. The suspension of claim 4 further comprising a second suspension for mounting to the opposite side of the vehicle and a second guide means for extending downwardly from the chassis and adjacent said second suspension, both said guide means adapted to be mounted outboard from their associated suspension so that the suspensions are straddled by said guide means.

10. The suspension claim 4 wherein the guide means includes a pair of spaced brackets, the torque beam having a member adapted to extend into the space defined between said spaced brackets as the beam oscillates with respect the chassis so that lateral displacement of the torque beam is thereby limited.

11. The suspension of claim 10 wherein the brackets are mounted to the chassis rearwardly of the torque beam, the torque beam member extending rearwardly of the torque beam and further comprising a bearing sleeve surrounding at least a portion of the torque beam member and aligned with the brackets to facilitate the unrestricted movement of the torque beam member within the confines of said defined space.

12. The suspension of claim 1 wherein the chassis has a frame and further comprising beam guide means secured to the torque beam and extending upwardly therefrom, said beam guide means being adjacent the chassis frame to limit the lateral displacement of the suspension as it oscillates with respect to the chassis.

13. The suspension of claim 12 wherein the beam guide means is outboard of the chassis frame, and further comprising a wear pad means secured to the chassis frame, the beam guide means being aligned with said wear pad means.

14. The suspension of claim 13 further comprising a second suspension for mounting to the opposite side of the vehicle, a second beam guide means for extending upwardly from said second suspension and adjacent the chassis frame, and a second wear pad means secured to the chassis frame for contacting said second beam guide means to thereby limit lateral displacement of the suspension and axle as they oscillate with respect to the chassis.

15. The suspension of claim 1 wherein the spring means is mounted to the torque beam rearwardly of the axle and further comprising a second spring means mounted to the torque beam forwardly of the axle and adapted to mount to the chassis.

16. The suspension of claim 15 wherein each spring means comprises an air spring.

17. A suspension for supporting a truck chassis from at least one axle comprising a torque beam for mounting to the axle, a first spring means mounted to the rear end of the torque beam, a second spring means mounted forwardly of the axle, said spring means being on opposite sides of the axle and adapted to mount to the chassis, and a pair of transversely oriented bushings mounted to the forward end of the torque beam and adapted for mounting to the chassis to permit limited angular movement of the torque beam as the axle moves with respect to the chassis.

18. The suspension of claim 17 wherein each of said spring means includes an air spring.

19. A suspension to support a truck chassis from an axle comprising a torque beam for rigid mounting to the axle, a spring mounted to the torque beam and adapted for mounting to the chassis, and means to limit lateral displacement of the suspension with respect to the chassis comprising guide means for mounting to the chassis and extending downwardly therefrom and adjacent the suspension to contact same, said guide means including a mounting bracket, and a roller means mounted near the lower end of said bracket, the torque beam having a generally flattened surface against which said roller means may roll to limit lateral displacement of said suspension.

20. The suspension of claim 19 further comprising a second suspension for mounting to the opposite side of the vehicle and a second guide means for extending downwardly from the chassis and adjacent said second suspension, both said guide means adapted to be mounted outboard from their associated suspension so that the suspensions are straddled by said guide means.

21. The suspension of claim 19 wherein the mounting bracket includes a boss, the roller means having an axle pin extending through said boss and mounting bracket, means securing the axle pin to the boss, and a roller rotatably mounted to the axis pin.

22. The suspension of claim 19 wherein the axle is a steer axle.

23. An air spring suspension to support a truck chassis from a drive axle comprising a generally longitudinally extending torque beam, said beam having a first generally horizontal member, a second generally horizontal member, and a generally vertical member extending between said first and second horizontal members, the first horizontal member being adapted to mount the axle, an air spring being mounted to and extending between the second horizontal member and the chassis, and a universal joint to mount the forward end of the first horizontal member to permit limited lateral and longitudinal movement of the torque beam as the axle moves with respect to the chassis.

24. The suspension of claim 23 wherein the universal joint comprises a pair of transversely oriented bushings, one of said bushings being generally coaxial with the forward end of the beam.

25. The suspension of claim 24 wherein the second bushing is mounted beneath the coaxial bushing, said second bushing thereby having its horizontal centerline proximate the horizontal plane of the axle centerline.

26. The suspension of claim 23 further comprising a second suspension for mounting between the other side of said truck and the axle, and a torsion roll-bar extending between said suspensions.

27. The suspension of claim 26 further comprising a radius rod for pivotally connecting to and extending laterally between the axle and the chassis.

* * * * *